US012581435B2

(12) United States Patent　　(10) Patent No.: US 12,581,435 B2
Ko et al.　　(45) Date of Patent: Mar. 17, 2026

(54) METHOD FOR SIDELINK COMMUNICATION IN NR V2X BY TERMINAL IN WHICH NR MODULE AND LTE MODULE COEXIST

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 669 days.

(21) Appl. No.: 17/995,782

(22) PCT Filed: Apr. 9, 2021

(86) PCT No.: PCT/KR2021/004477
　　§ 371 (c)(1),
　　(2) Date: Oct. 7, 2022

(87) PCT Pub. No.: WO2021/206500
　　PCT Pub. Date: Oct. 14, 2021

(65) Prior Publication Data
　　US 2023/0171719 A1　　Jun. 1, 2023

Related U.S. Application Data

(60) Provisional application No. 63/007,917, filed on Apr. 9, 2020.

(51) Int. Cl.
　　*H04W 56/00*　　(2009.01)
　　*H04W 72/25*　　(2023.01)
(52) U.S. Cl.
　　CPC ....... *H04W 56/0015* (2013.01); *H04W 72/25* (2023.01)

(58) Field of Classification Search
　　CPC ... H04W 56/0015; H04W 72/25; H04W 8/24; H04W 4/40; H04W 48/12; H04W 88/06;
　　　　　　(Continued)

(56) References Cited

U.S. PATENT DOCUMENTS

2020/0229114 A1*　7/2020　Ryu ........................ H04W 4/40
2021/0045100 A1*　2/2021　Park ...................... H04L 1/1854
　　　　　　　　(Continued)

FOREIGN PATENT DOCUMENTS

WO　　2020-032698　　2/2020
WO　　2020-033751　　2/2020
　　　　　　(Continued)

OTHER PUBLICATIONS

European Patent Office Application Serial No. 21784470.3, Search Report dated Apr. 10, 2024, 15 pages.
　　　　　　(Continued)

*Primary Examiner* — Jay P Patel
*Assistant Examiner* — Shehab A Alawdi
(74) *Attorney, Agent, or Firm* — LEE, HONG, DEGERMAN, KANG & WAIMEY

(57)　　　　ABSTRACT

An embodiment of the present disclosure provides a method for performing sidelink communication by a first device. The method may comprise the steps of: receiving synchronization information from a synchronization source; acquiring LTE synchronization on the basis of the synchronization information via an LTE module included in the first device; acquiring NR synchronization arranged with the LTE synchronization, via an NR module included in the first device; generating NR SLSS and NR PSBCH information on the basis of information related to the LTE synchronization and the arranged NR synchronization; transmitting an NR S-SSB, which includes the NR SLSS and NR PSBCH information, to a second device performing sidelink com-
　　　　　　(Continued)

munication on the basis of the NR module; transmitting first SCI to the second device via a PSCCH; and transmitting, to the second device, data and second DCI differing from the first SCI via a PSSCH related to the PSCCH on the basis of a sidelink resource determined on the basis of the first SCI.

11 Claims, 19 Drawing Sheets

(58) Field of Classification Search
CPC . H04W 92/18; H04W 72/0446; H04W 48/10; H04W 56/0025; H04W 72/1263
See application file for complete search history.

(56) References Cited

U.S. PATENT DOCUMENTS

2021/0204307 A1    7/2021  Lee et al.
2022/0070879 A1*   3/2022  Ryu .................... H04W 52/383

FOREIGN PATENT DOCUMENTS

WO          2020-036455        2/2020
WO          2020-063611        4/2020

OTHER PUBLICATIONS

Samsung, "On Synchronization Mechanisms for NR V2X," R1-1901049, 3GPP TSG RAN WG1 Ad-Hoc Meeting 1901, Jan. 2019, 9 pages.
Catt, "Offline summary on AI 7.2.4.1.3 Synchronization mechanism," R1-1814147, 3GPP TSG RAN1 Meeting #95, Nov. 2018, 20 pages.
PCT International Application No. PCT/KR2021/004477, International Search Report dated Jul. 9, 2021, 4 pages.
Vivo, "Remaining issues on in-device coexistence between NR and LTE sidelinks," R1-2000320, 3GPP TSG-RAN WG1 Meeting #100, e-Meeting, Mar. 2020, 6 pages.
LG Electronics, "Summary of RAN1 Agreements/Working assumptions in WI 5G V2X with NR sidelink," R1-1913601, 3GPP TSG RAN WG1 #99, Nov. 2019, 42 pages.

* cited by examiner

FIG. 3

FIG. 7
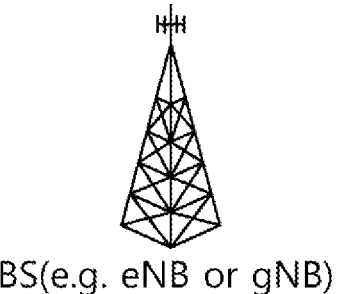
BS(e.g. eNB or gNB)
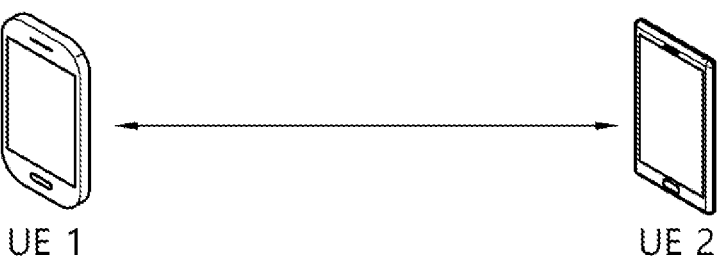
UE 1               UE 2

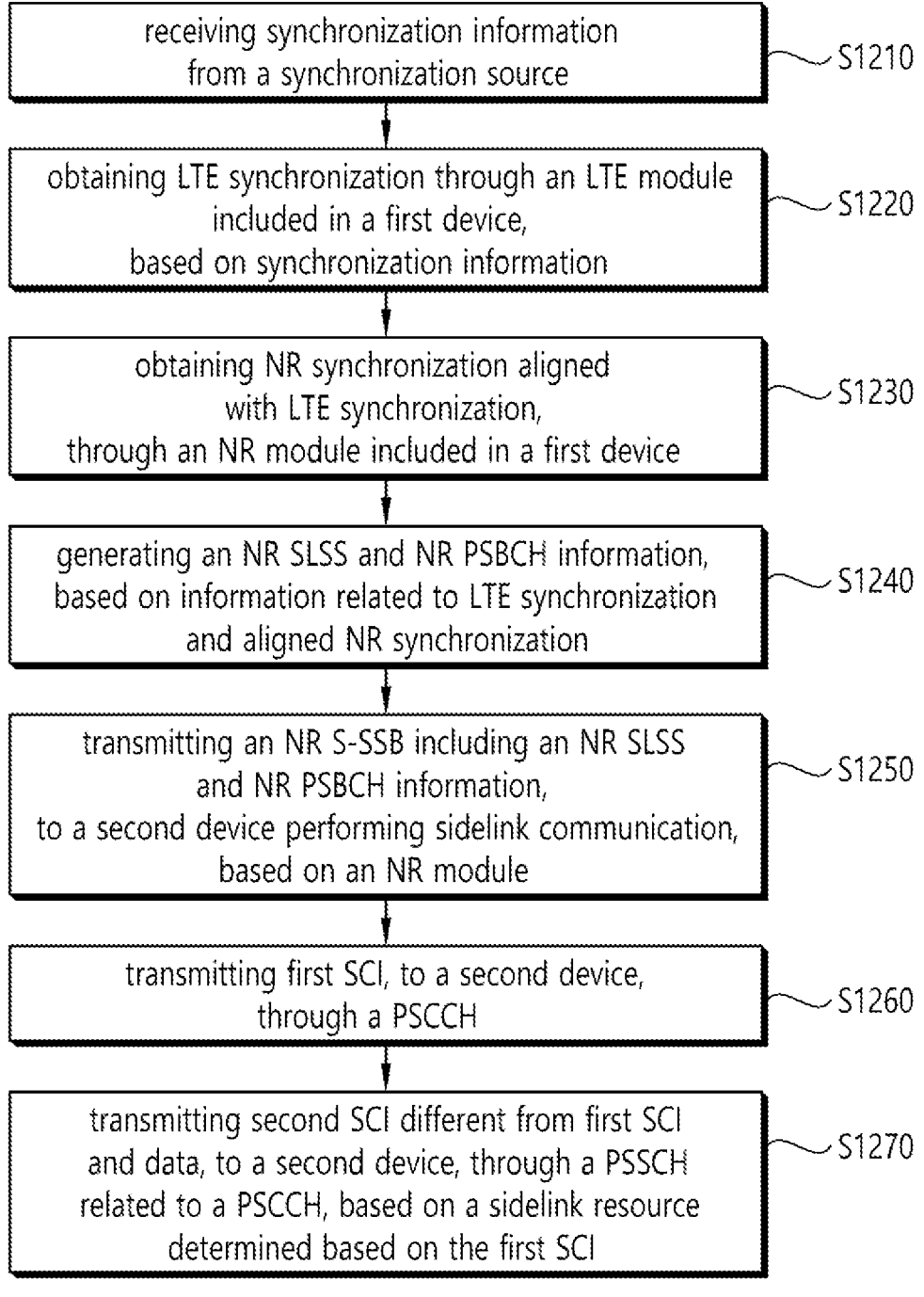

receiving synchronization information
from a synchronization source — S1210 obtaining LTE synchronization through an LTE module
included in a first device,
based on synchronization information — S1220 obtaining NR synchronization aligned
with LTE synchronization,
through an NR module included in a first device — S1230 generating an NR SLSS and NR PSBCH information,
based on information related to LTE synchronization
and aligned NR synchronization — S1240 transmitting an NR S-SSB including an NR SLSS
and NR PSBCH information,
to a second device performing sidelink communication,
based on an NR module — S1250 transmitting first SCI, to a second device,
through a PSCCH — S1260 transmitting second SCI different from first SCI
and data, to a second device, through a PSSCH
related to a PSCCH, based on a sidelink resource
determined based on the first SCI — S1270

Figure 17:
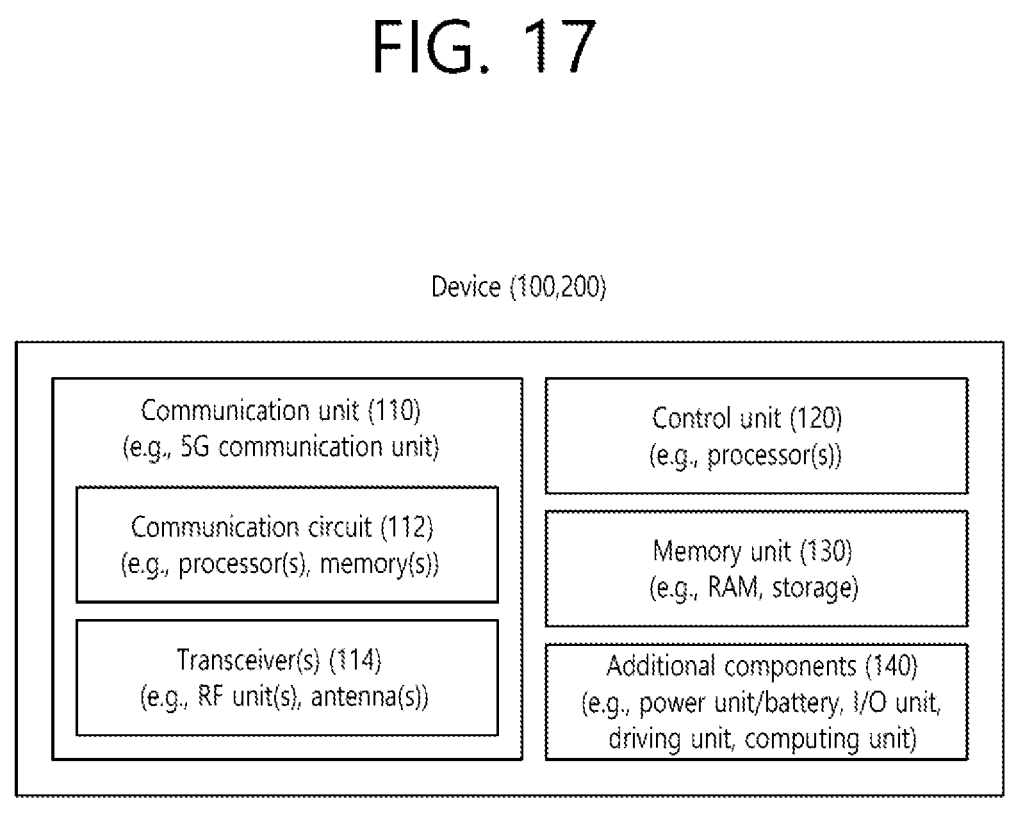

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 19

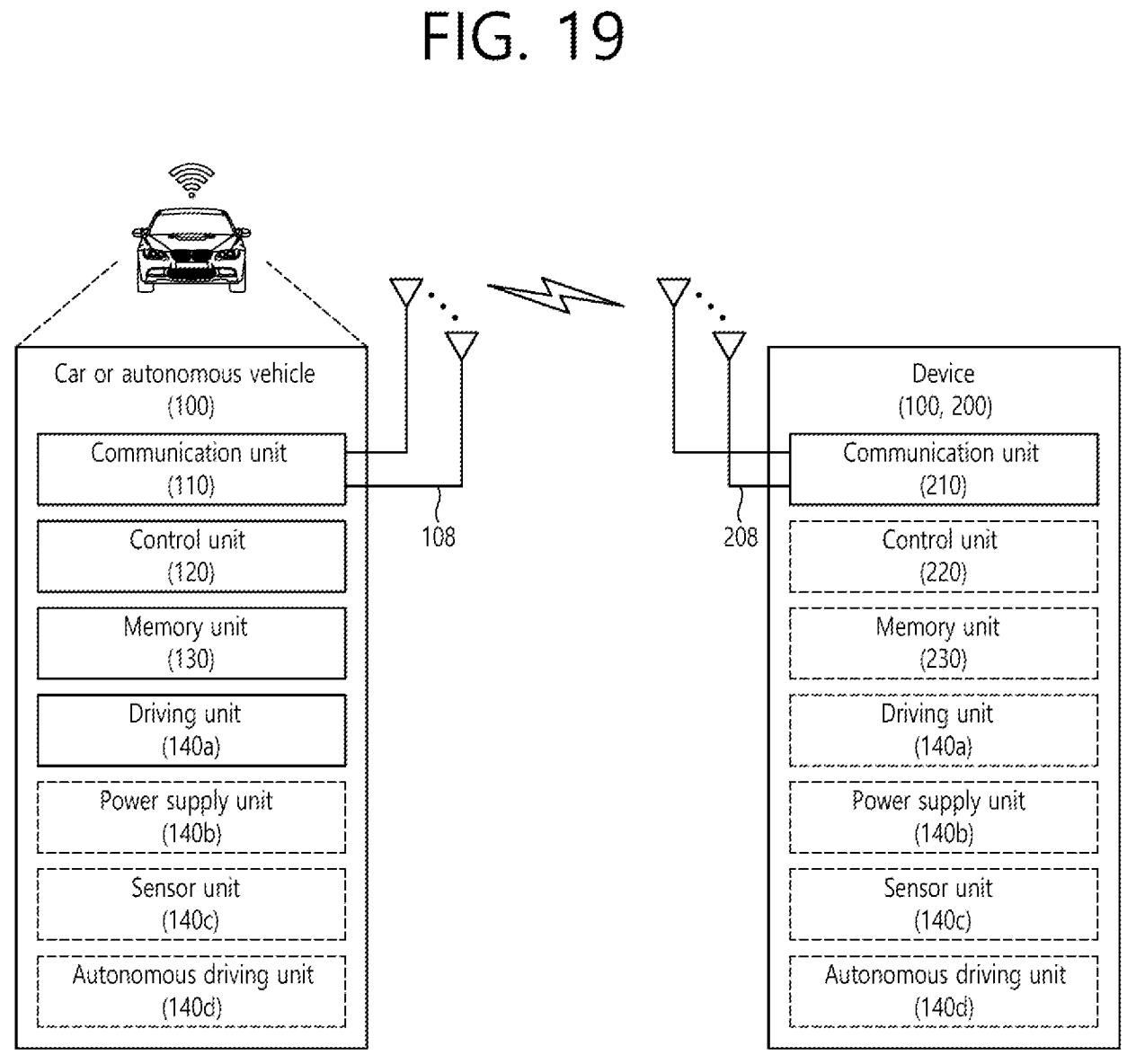

Device
(100, 200)
- Communication unit (210)
- Control unit (220)
- Memory unit (230)
- Driving unit (140a)
- Power supply unit (140b)
- Sensor unit (140c)
- Autonomous driving unit (140d)

208

108

Car or autonomous vehicle (100)
- Communication unit (110)
- Control unit (120)
- Memory unit (130)
- Driving unit (140a)
- Power supply unit (140b)
- Sensor unit (140c)
- Autonomous driving unit (140d)

METHOD FOR SIDELINK COMMUNICATION IN NR V2X BY TERMINAL IN WHICH NR MODULE AND LTE MODULE COEXIST

CROSS-REFERENCE TO RELATED APPLICATION(S)

This application is the National Stage filing under 35 U.S.C. 371 of International Application No. PCT/KR2021/ 004477, filed on Apr. 9, 2021, which claims the benefit of U.S. Provisional Application No. 63/007,917, filed on Apr. 9, 2020, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

A technical object of the present disclosure is to provide a sidelink (SL) communication method between devices (or UEs) and a device (or UE) for performing the same.

Another technical object of the present disclosure is to provide a sidelink communication method of a UE in which an NR module and an LTE module coexist in NR V2X and a device (or UE) for performing the same.

According to an embodiment of the present disclosure, a method for performing, by a first device, sidelink communication may be proposed. The method may comprise: receiving synchronization information from a synchronization source; obtaining long-term evolution (LTE) synchronization through an LTE module included in the first device, based on the synchronization information; obtaining new radio (NR) synchronization aligned with the LTE synchronization, through an NR module included in the first device; generating an NR sidelink synchronization signal (SLSS) and NR physical sidelink broadcast channel (PSBCH) information, based on information related to the LTE synchronization and the aligned NR synchronization; transmitting an NR sidelink-synchronization signal block (S-SSB) including the NR SLSS and the NR PSBCH information, to a second device performing sidelink communication, based on the NR module; transmitting first sidelink control information (SCI), to the second device, through a physical sidelink control channel (PSCCH); and transmitting second SCI different from the first SCI and data, to the second device, through a physical sidelink shared channel (PSSCH) related to the PSCCH, based on a sidelink resource determined based on the first SCI.

According to an embodiment of the present disclosure, a first device for performing sidelink communication may be proposed. For example, the first device may comprise: one or more memories storing instructions; one or more transceivers; and one or more processors connected to the one or more memories and the one or more transceivers, wherein the one or more processors execute the instructions to: receive synchronization information from a synchronization source; obtain long-term evolution (LTE) synchronization through an LTE module included in the first device, based on the synchronization information; obtain new radio (NR) synchronization aligned with the LTE synchronization, through an NR module included in the first device; generate an NR sidelink synchronization signal (SLSS) and NR physical sidelink broadcast channel (PSBCH) information, based on information related to the LTE synchronization and the aligned NR synchronization; transmit an NR sidelink-synchronization signal block (S-SSB) including the NR SLSS and the NR PSBCH information, to a second device performing sidelink communication, based on the NR module; transmit first sidelink control information (SCI), to the second device, through a physical sidelink control channel (PSCCH); and transmit second SCI different from the first SCI and data, to the second device, through a physical sidelink shared channel (PSSCH) related to the PSCCH, based on a sidelink resource determined based on the first SCI.

Effects of the Disclosure

The user equipment (UE) can efficiently perform SL communication.

In one embodiment, it may be possible to remove the ambiguity related to a transmission of an NR S-SSB during in-device coexistence (IDC), and to minimize the interference to the existing LTE V2X operation.

BRIEF DESCRIPTION OF THE DRAWINGS

FIG. 3 shows a radio protocol architecture, based on an embodiment of the present disclosure.

FIG. 7 shows a UE performing V2X or SL communication, based on an embodiment of the present disclosure.

FIG. 12 is a flowchart showing a method for a first device to perform sidelink communication according to an embodiment of the present disclosure.

FIG. 17 shows another example of a wireless device, based on an embodiment of the present disclosure.

FIG. 19 shows a vehicle or an autonomous vehicle, based on an embodiment of the present disclosure.

DESCRIPTION OF EXEMPLARY EMBODIMENTS

Figure 1:
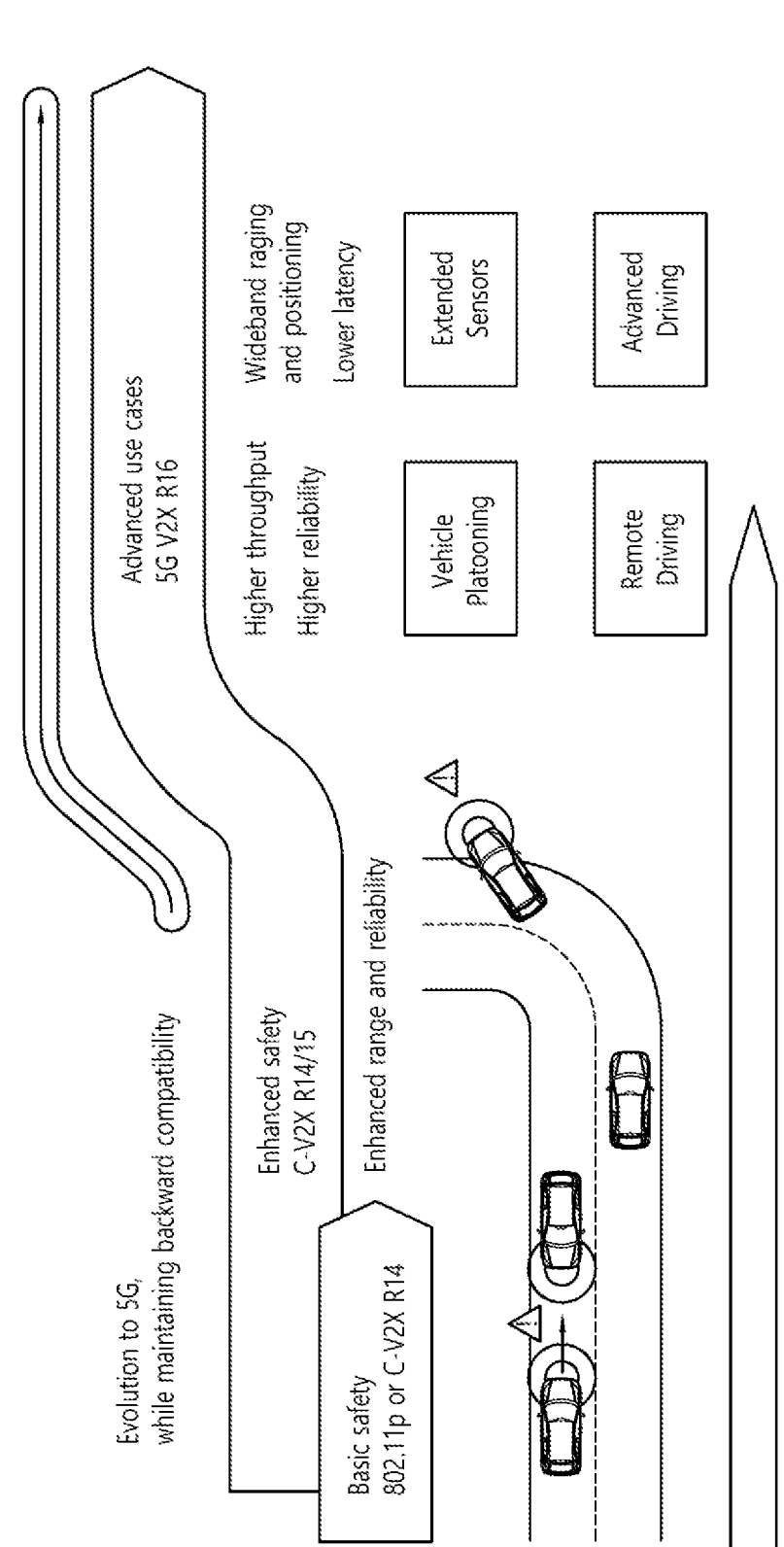
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
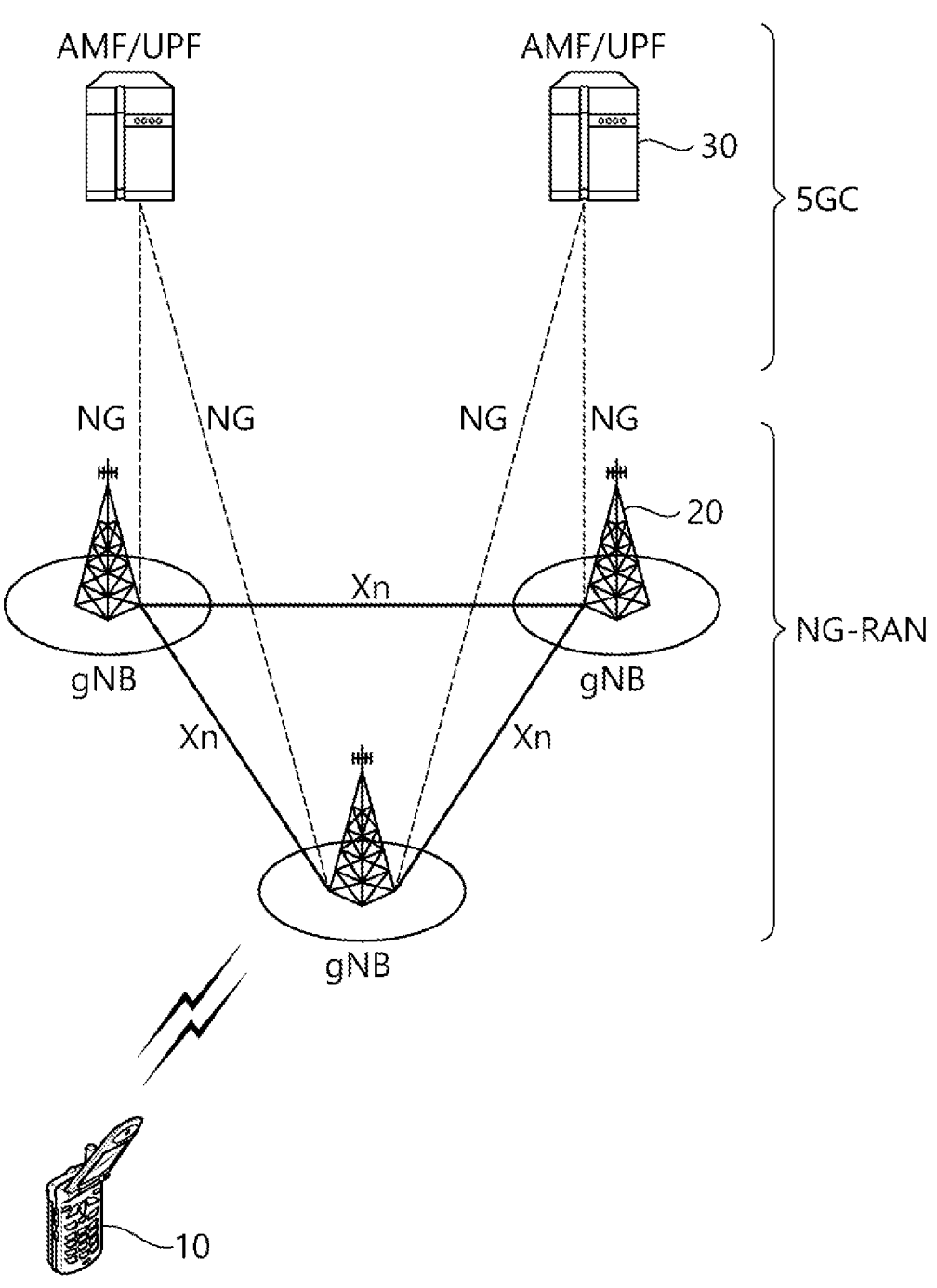
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
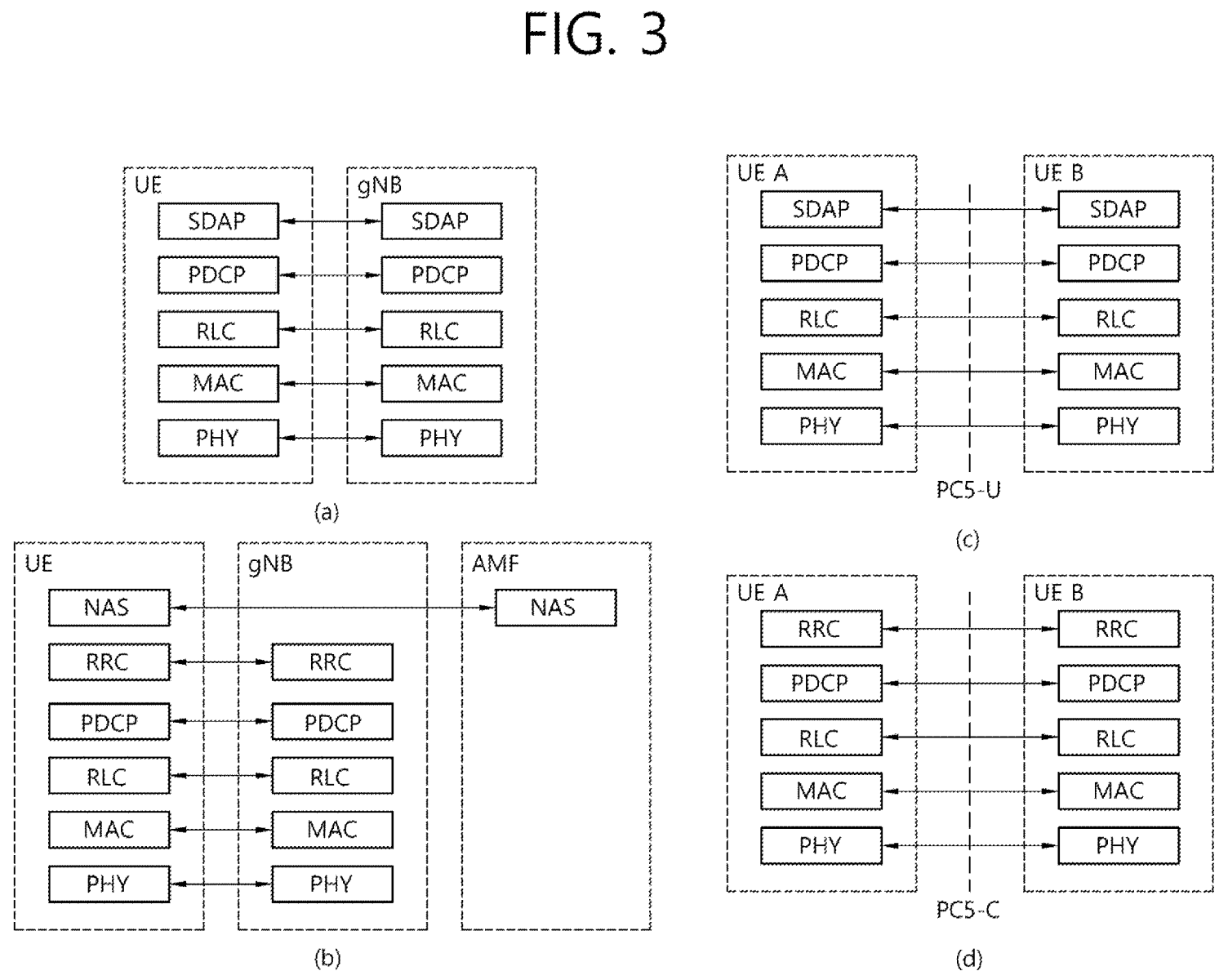

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
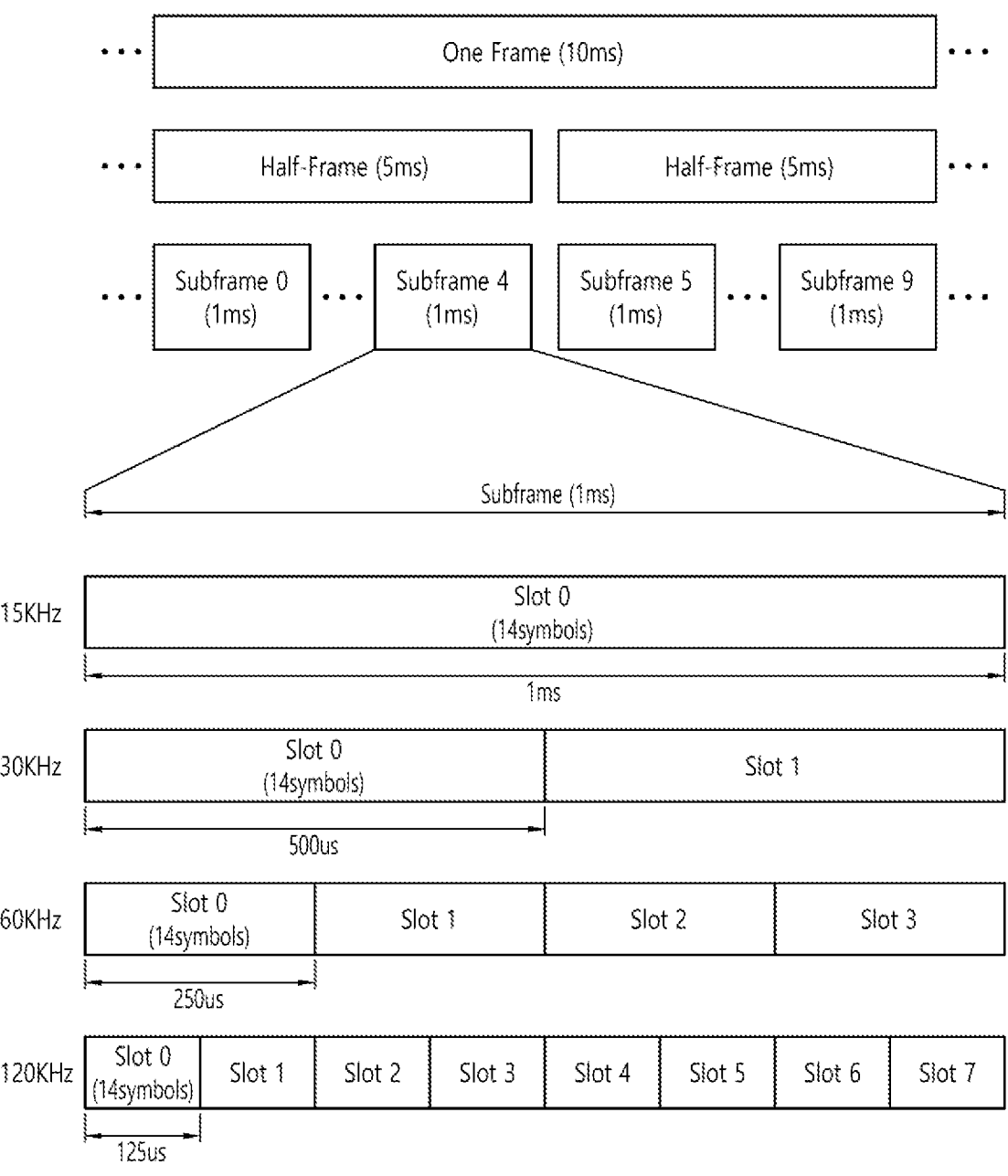
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
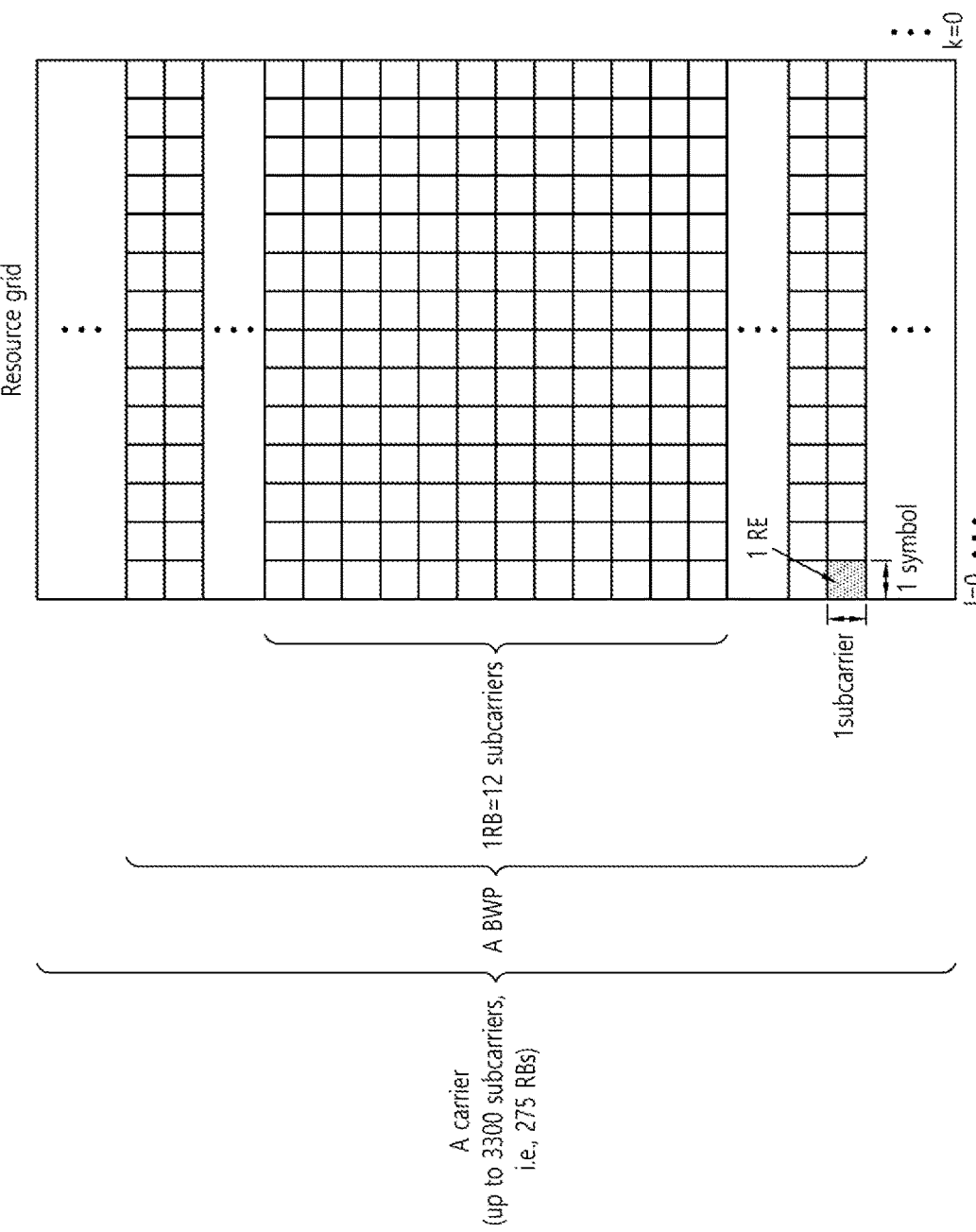
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
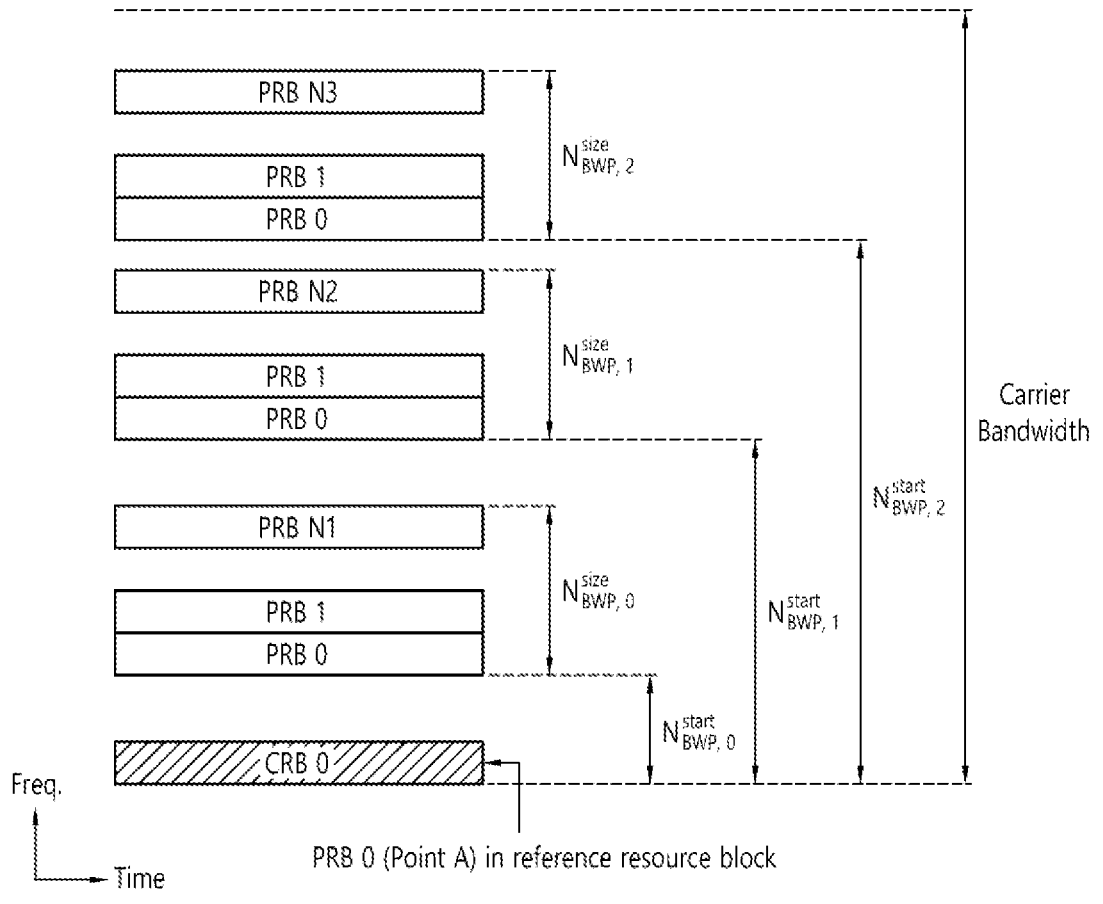
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
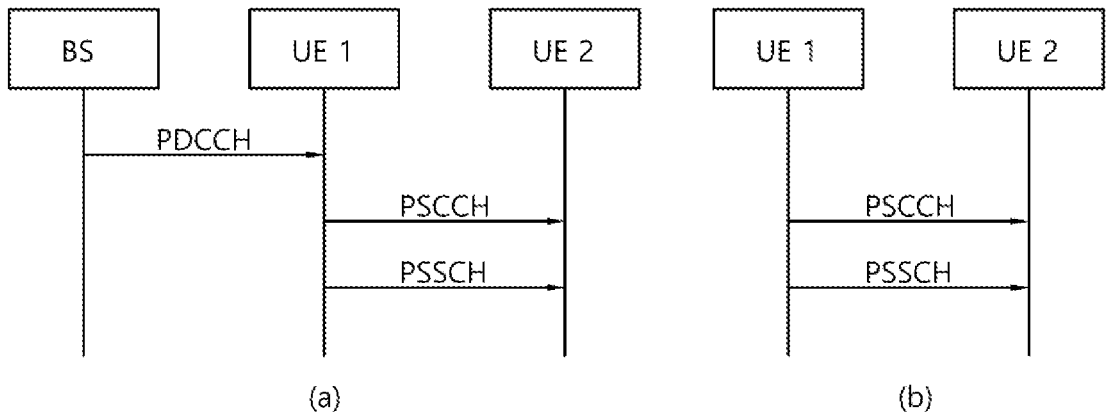
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
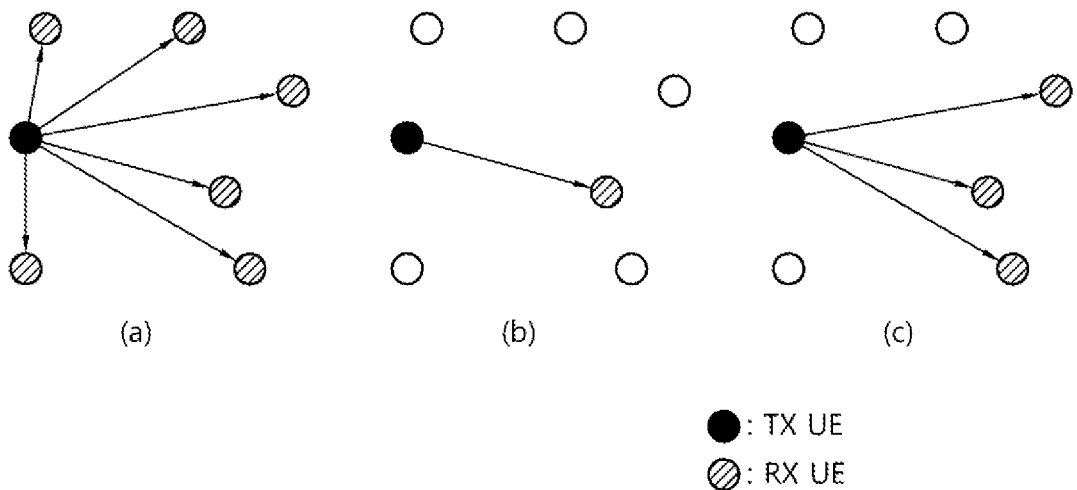
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, synchronization obtainment of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 10:
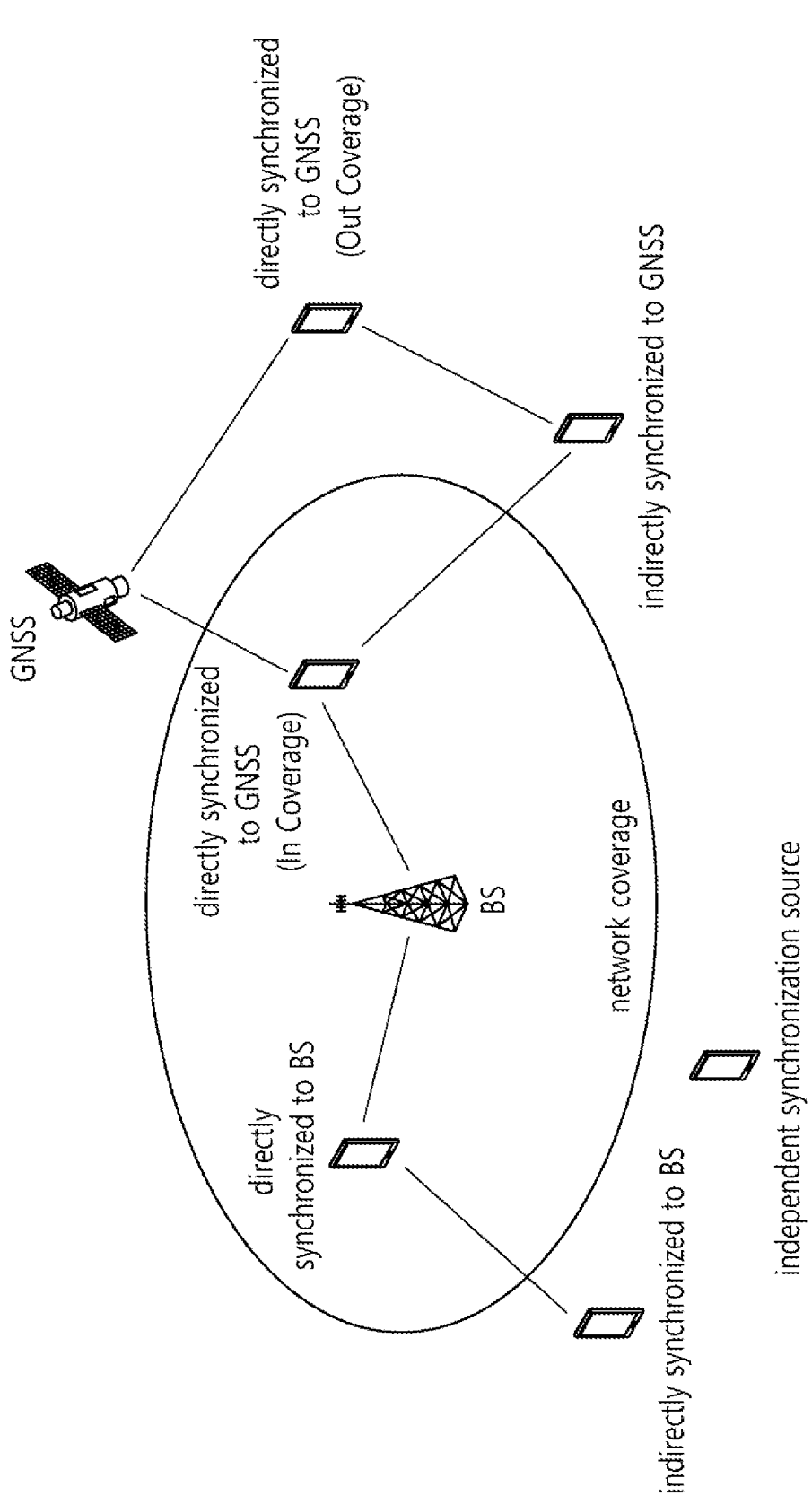
FIG. 10 shows a synchronization source or synchronization reference of V2X based on an embodiment of the present disclosure.

FIG. 10 shows a synchronization source or synchronization reference of V2X based on an embodiment of the present disclosure.

Referring to FIG. 10, In V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, each SLSS may have an SL sidelink synchronization identifier (SLSS ID).

For example, in case of LTE SL or LTE V2X, a value of the SLSS ID may be defined based on a combination of 2 different S-PSS sequences and 168 different S-SSS sequences. For example, the number of SLSS IDs may be 336. For example, the value of the SLSS ID may be any one of values 0 to 335.

For example, in case of NR SL or NR V2X, the value of the SLSS ID may be defined based on a combination of 2 different S-PSS sequences and 336 different S-SSS sequences. For example, the number of SLSS IDs may be 672. For example, the value of the SLSS ID may be any one of values 0 to 671. For example, one S-PSS out of the 2 different S-PSSs may be associated/related with in-coverage, and the other S-PSS may be associated/related with out-of-coverage. For example, the SLSS IDs 0 to 335 may be used in the in-coverage, and the SLSS IDs 336 to 671 may be used in the out-of-coverage.

Figure 11:
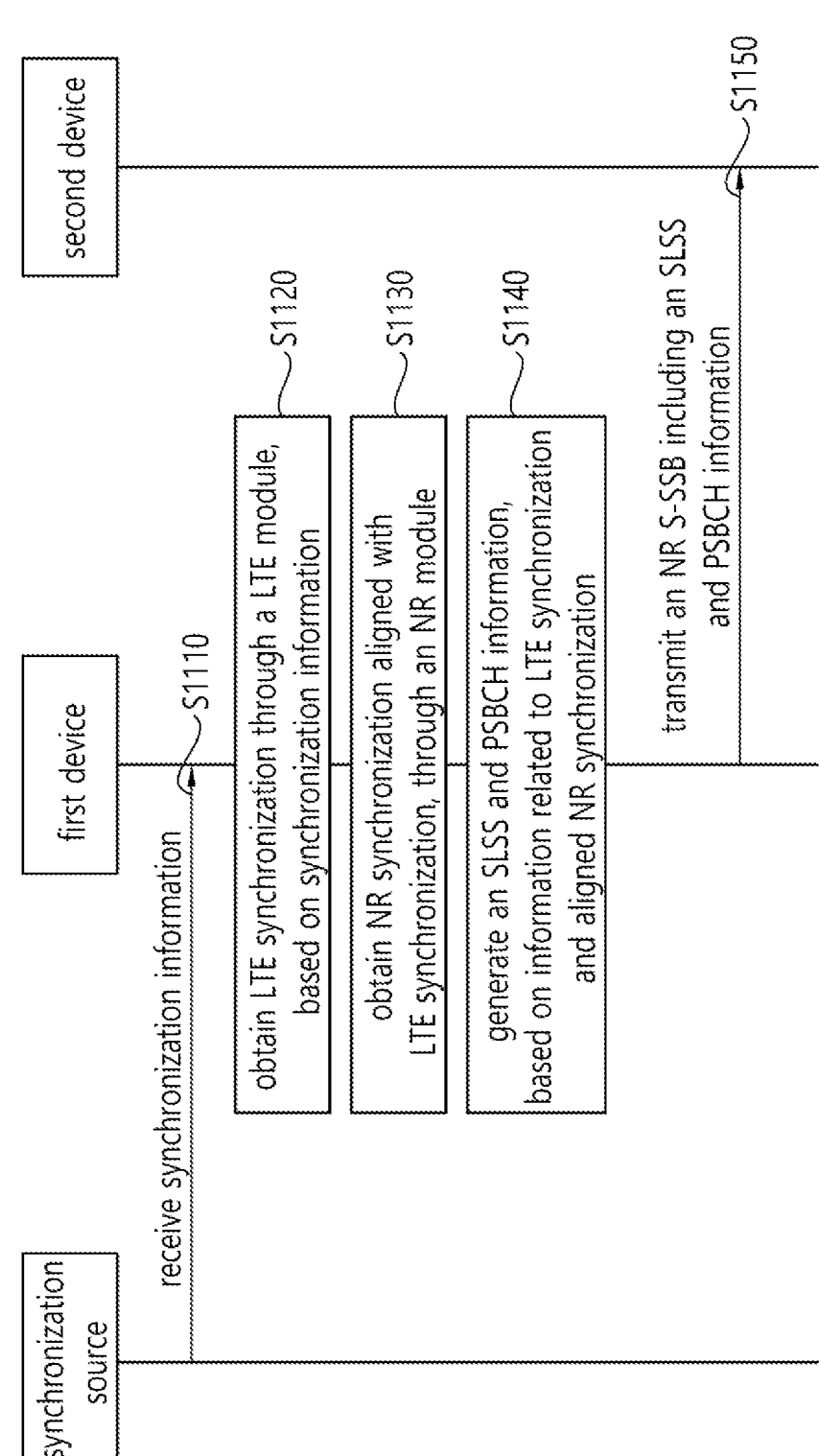
FIG. 11 shows a method for a first device and a second device to perform sidelink communication based on synchronization information received from a synchronization source, according to an embodiment of the present disclosure.

FIG. 11 shows a method for a first device and a second device to perform sidelink communication based on synchronization information received from a synchronization source, according to an embodiment of the present disclosure.

In an example, the synchronization source shown in FIG. 11 may be a GNSS, a base station, a synchronization source related to the GNSS (For example, UE) or a synchronization source related to a base station (For example, UE).

In step S1110, a first device according to an embodiment may receive synchronization information from a synchronization source. In step S1120, a first device according to an embodiment may obtain LTE synchronization through a long-term evolution (LTE) module included in the first device, based on the synchronization information. In step S1130, a first device according to an embodiment may obtain NR synchronization aligned with the LTE synchronization, through a new radio (NR) module included in the first device. In step S1140, a first device according to an embodiment may generate an NR sidelink synchronization signal (SLSS) and NR physical sidelink broadcast channel (PSBCH) information based on information related to the LTE synchronization and the aligned NR synchronization. In step S1150, a first device according to an embodiment may transmit an NR sidelink-synchronization signal block (S-SSB) including the NR SLSS and the NR PSBCH information, to a second device performing sidelink communication based on an NR module. In step S1160, a first device according to an embodiment may transmit first sidelink control information (SCI) to the second device, through a physical sidelink control channel (PSCCH). In step S1170, a first device according to an embodiment may transmit second SCI different from the first SCI and data, to the second device through a physical sidelink shared channel (PSSCH) related to the PSCCH, based on a sidelink resource determined based on the first SCI.

Hereinafter, embodiments and/or examples that may be directly or indirectly related to at least one of steps S1110 to S1150 will be reviewed. On the other hand, the following embodiments and/or examples are only related to at least one of steps S1110 to S1150, so a somewhat different feature should not be construed as deviating from the scope of the present specification, even if at least one of the following embodiments and/or examples and steps S1110 to S1150 is somewhat different in content.

In the case of a UE (or UE, device, etc.) equipped with both an LTE V2X module (or LTE module) and an NR V2X module (or NR module), a method in which signals transmitted by the LTE V2X module and the NR V2X module and the corresponding operation can coexist is required. In an example, an LTE V2X module and an NR V2X module may transmit a signal in a time division multiplexing (TDM) scheme, and may transmit in a frequency division multiplexing (FDM) scheme using different frequencies. In this case, when transmitting in a TDM method, so that an LTE V2X signal (or LTE signal) and an NR V2X signal (or NR signal) can be simultaneously transmitted, the LTE V2X signal and the NR V2X signal can be transmitted by matching the boundary of each (sub) frame. Even in the case of a FDM method, when transmitting an LTE V2X signal and an NR V2X signal at the same time, there may be a problem that the transmission power of a UE must be divided and used, the LTE V2X signal and the NR V2X signal can be transmitted by matching the boundary of each (sub) frame.

In the present disclosure, an NR V2X synchronization process in which a UE equipped with both an LTE V2X module and an NR V2X module can transmit an LTE V2X signal and an NR V2X signal by matching the boundary of each (sub)frame is proposed.

In an embodiment, for a UE equipped with both an LTE V2X module and an NR V2X module, a coexistence operation between the two modules described above may be predefined or pre-configured by a network to the UE, or may be configured internally in the UE.

In an embodiment, when an operation in which an LTE V2X module and an NR V2X module coexist is configured as described above, a UE may be predefined or pre-configured by a network to the UE, or may be configured internally in the UE, not to transmit an NR V2X sidelink-synchronization signal block (S-SSB) or sidelink synchronization signal (SLSS). As an embodiment of disabling an S-SSB transmission, a network may not pre-configure a UE with resources required for transmitting and receiving an S-SSB or SLSS signal. Alternatively, even if resources required for transmitting and receiving an S-SSB or SLSS signal are configured, a UE may be configured not to transmit the S-SSB or SLSS signal internally.

In an embodiment, if the coexistence operation is configured inside a UE, the UE may report the capability (information) for the coexistence operation of an LTE V2X module and an NR V2X module to a base station. When a base station receives a report on the capability (information) for the coexistence operation of an LTE V2X module and an NR V2X module from a UE, it may not configure a resource for transmission of an S-SSB or SLSS to the UE.

In an embodiment, when a UE equipped with both an LTE V2X module and an NR V2X module and a UE supporting only NR V2X operation coexist spatially, the UE may not expect a base station to configure or pre-configure the coexistence operation of the LTE V2X module and the NR V2X module to the UE.

In an embodiment, when a UE equipped with both an LTE V2X module and an NR V2X module and a UE supporting only NR V2X operation coexist spatially, to ensure coexistence operation of a UE equipped with both an LTE V2X module and an NR V2X module, and at the same time avoid a problem such as interference between UEs that occur when spatially coexisting with a UE supporting only NR V2X operation, a base station may pre-configure the UE to select a GNSS-based synchronization rule corresponding to the left column from among the rules for selecting a reference synchronization signal shown in Table 7 below. Alternatively, the base station may pre-configure the UE not to select the P3/P4/P5 synchronization source on the left column that prioritizes the base station timing even if the GNSS-based synchronization rule is selected. In Table 7 below, P0, P1, P2, P3, P4, P5 and P6 are synchronization sources with high priority to be selected as a reference synchronization in order. Table 7 below discloses the same/similar content as Table 6 above.

TABLE 7

| GNSS-based synchronization | gNB/eNB-based synchronization |
|---|---|
| P0: GNSS | P0': gNB/eNB |
| P1: UE directly synchronized to GNSS | P1': UE directly synchronized to gNB/eNB |
| P2: UE indirectly synchronized to GNSS | P2': UE indirectly synchronized to gNB/eNB |
| P3: gNB/eNB | P3': GNSS |
| P4: UE directly synchronized to gNB/eNB | P4': UE directly synchronized to GNSS |
| P5: UE indirectly synchronized to gNB/eNB | P5': UE indirectly synchronized to GNSS |
| P6: the remaining UEs have the lowest priority. | P6': the remaining UEs have the lowest priority. |

In an embodiment, when a UE equipped with both an LTE V2X module and an NR V2X module and a UE supporting only NR V2X operation coexist spatially, an NR V2X UE may be predefined or configured or pre-configured by a base station to select an LTE V2X UE as a reference synchronization.

In an embodiment, when a UE equipped with both an LTE V2X module and an NR V2X module and a UE supporting only NR V2X operation coexist spatially, it may be predefined so that an NR V2X UE cannot select a base station (For example, gNB) and an NR V2X UE as a reference synchronization, or a base station may configure or pre-configure it to the UE.

In an embodiment, referring to the Table 7 above, an LTE V2X UE and an NR V2X UE may be predefined to have the same priority at being selected as a reference synchronization signal in the left column and the right column, or the base station may pre-configured or configured it to a UE.

In an embodiment, when the coexistence operation is configured, a UE equipped with both an LTE V2X module and an NR V2X module can use time synchronization, determined by the LTE V2X module performing synchronization according to a synchronization process defined in LTE V2X without performing synchronization according to a synchronization process defined in NR V2X, as it is for signal transmission and related operations of the NR V2X module. By doing this, it is possible to match the (sub) frame boundary of an NR V2X signal and the (sub) frame boundary of an LTE V2X signal.

In an embodiment, it may be predefined or pre-configured to a UE by a base station, to transmit or not transmit an NR V2X S-SSB signal or an SLSS signal. Or, when a base station pre-configures or configures a resource necessary for transmitting an NR V2X S-SSB signal or an SLSS signal to a UE, the UE may transmit an NR V2X S-SSB signal or an SLSS signal, if the base station does not configure or pre-configure a resource required for transmitting an NR V2X S-SSB signal or an SLSS signal to a UE, the UE may not transmit an NR V2X S-SSB signal or an SLSS signal.

In an embodiment, when a coexistence operation of an LTE V2X module and an NR V2X module is configured, a Direct Frame Number (DFN) or subframe index of an NR V2X signal transmitted by the NR V2X module may be determined from a DFN or a subframe index of an LTE V2X signal transmitted by the LTE V2X module. For example, an NR V2X DFN or a subframe index (or a slot index) may be configured to be the same as an LTE V2X DFN or a subframe index, or an NR V2X DFN or a subframe index (or a slot index) may be configured by applying a specific offset value to an LTE V2X DFN or a subframe index. The specific offset value may be predefined or may be pre-configured by a base station to a UE.

In an embodiment, when a coexistence operation of an LTE V2X module and an NR V2X module is configured, and it is configured to transmit an NR V2X S-SSB signal or an SLSS signal, a UE (in which an LTE V2X module and an NR V2X module coexist) may determine an NR SLSSID as follows.

For example, an LTE PSCCH inCoverage value may be used equally as an NR PSSCH inCoverage value, if LTE SLSSID=0, it may be configured (or determined) as NR SLSSID=0, if LTE SLSSID=168, it may be configured (or determined) as NR SLSSID=336, if LTE SLSSID=169, it may be configured (or determined) as NR SLSSID=337.

For example, in case other than the above LTE SLSSID, an LTE SLSSID may be used as an NE SLSSID as it is, or a value obtained by adding a specific offset value predefined or pre-configured to a UE by a base station to an LTE SLSSID may be used as an NR SLSSID, or a value obtained by multiplying an LTE SLSS ID by 2 may be used as an NR SLSSID, or a specific SLSSID value previously defined or previously configured by a base station to a UE may be used as an NR SLSSID.

In an embodiment, an NR V2X module may determine an NR SLSSID as follows in a form in which a hop count increases by one by using an LTE V2X module as a reference synchronization.

In an example, two LTE synchronization sources may be configured. In this case, if LTE SLSSID=0 and LTE PSBCH inCoverage=1, it may be configured (or determined) as NR SLSSID=0 and NR PSBCH inCoverage=0. Or, if LTE SLSSID=0 and LTE PSBCH inCoverage=0, it may be configured (or determined) as NR SLSSID=336 and NR PSBCH inCoverage=0. Or, if LTE SLSSID=168 and LTE PSBCH inCoverage=0, it may be configured (or determined) as NR SLSSID=336 and NR PSBCH inCoverage=0.

In another example, LTE synchronization sources may be configured to three. At this time, if LTE SLSSID=0, it may be configured (or determined) as NR SLSSID=337. Alternatively, if LTE SLSSID=337, it may be configured (or determined) as NR SLSSID=337. Alternatively, if LTE PSBCH inCoverage=1, it may be configured (or determined) as NR PSBCH inCoverage=0. Alternatively, if LTE PSBCH inCoverage=0, it may be configured (or determined) as NR PSBCH inCoverage=0.

In the other example, a case in which LTE SLSSID different from the above two examples is configured will be described. If LTE SLSSID={1, . . . , 167} and LTE PSBCH inCoverage=1, it may be configured as NR PSBCH inCoverage=0 and LTE SLSSID may be used as an NR SLS SID as it is, or a value obtained by adding a specific offset value predefined or (pre-)configured to a UE by a base station to an LTE SLS SID may be used as an NR SLSSID, or a LTE SLSS ID multiplied by 2 may be used as an NR SLSSID, or a specific SLSSID value predefined or (pre-)configured by a base station to a UE may be used as an NR SLSSID.

In the other example, if LTE SLSSID={170, . . . , 335} and LTE PSBCH inCoverage=0, it may be configured as NR PSBCH inCoverage=0 and an LTE SLSSID may be used as an NR SLSSID as it is, or a value obtained by adding a specific offset value predefined or (pre-)configured to a UE by a base station to an LTE SLSSID may be used as an NR SLSSID, or a value obtained by multiplying an LTE SLSS ID by 2 may be used as an NR SLSSID. Alternatively, a specific SLSSID value predefined or (pre-)configured by a base station to a UE may be used as an NR SLSSID.

In an embodiment, an NR PSBCH inCoverage value may be configured to be the same as an LTE PSBCH inCoverage value, or may be predefined or (pre-)configured by a base station to a UE, or may be configured to 1 in case of in-coverage and 0 in case of out-of-coverage, based on an NR base station.

In an embodiment, an NR PSBCH TDD configuration value may be applied as a value defined in NR V2X, an NR PSBCH slot index or an S-SSB index value may be determined based on a DFN or subframe index determined from an LTE V2X module.

In an embodiment, when a coexistence operation of an LTE V2X module and an NR V2X module is configured, an NR V2X module may transmit only an NR SLSS without transmitting an NR PSBCH.

In an embodiment, an NR S-SSB signal may indicate that the origin of a reference synchronization signal of the NR S-SSB signal transmitted through an SLSS or PSBCH is an eNB following LTE V2X timing, a UE directly synchronized with an eNB, or a UE synchronized with an eNB indirectly.

In the present disclosure, an NR V2X synchronization process that allows signals transmitted by an LTE V2X module and an NR V2X module and the corresponding operation to coexist, in the case of a UE equipped with both the LTE V2X module and the NR V2X module is proposed. According to the proposed disclosure, When the coexistence operation is configured, an NR V2X module may use a synchronization timing of an LTE V2X module as it is, and may determine an NR V2X DFN and/or a subframe index therefrom. In addition, when the coexistence operation is configured, it is possible not to cause an interference problem with a UE supporting only an NR V2X operation by not transmitting an NR S-SSB.

FIG. 12 is a flowchart showing a method for a first device to perform sidelink communication according to an embodiment of the present disclosure.

Operations disclosed in the flowchart of FIG. 12 may be performed in combination with various embodiments of the present disclosure. In one example, the operations disclosed in the flowchart of FIG. 12 may be performed based on at least one of devices shown in FIGS. 14 to 19. In one example, a first device of FIG. 12 may correspond to a first wireless device 100 of FIG. 15 to be described later, and a second device may correspond to a second wireless device 200 of FIG. 15. In another example, a first device of FIG. 12 may correspond to a second wireless device 200 of FIG. 15 to be described later, and a second device may correspond to a first wireless device 100.

In step S1210, a first device according to an embodiment may receive synchronization information from a synchronization source.

In step S1220, a first device according to an embodiment may obtain long-term evolution (LTE) synchronization through an LTE module included in the first device, based on the synchronization information.

In step S1230, a first device according to an embodiment may obtain new radio (NR) synchronization aligned with the LTE synchronization, through an NR module included in the first device.

In step S1240, a first device according to an embodiment may generate an NR sidelink synchronization signal (SLSS) and NR physical sidelink broadcast channel (PSBCH) information, based on information related to the LTE synchronization and the aligned NR synchronization.

In step S1250, a first device according to an embodiment may transmit an NR sidelink-synchronization signal block (S-SSB) including the NR SLSS and the NR PSBCH information, to a second device performing sidelink communication, based on the NR module.

In step S1260, a first device according to an embodiment may transmit first sidelink control information (SCI), to the second device, through a physical sidelink control channel (PSCCH).

In step S1270, a first device according to an embodiment may transmit second SCI different from the first SCI and data, to the second device, through a physical sidelink shared channel (PSSCH) related to the PSCCH, based on a sidelink resource determined based on the first SCI.

In an embodiment, the information related to the LTE synchronization may be an LTE master information block (MIB), generated based on the synchronization information.

In an embodiment, the information related to the LTE synchronization may be index information regarding a time resource of an LTE signal.

In an embodiment, a subframe boundary of an LTE signal based on the LTE synchronization may coincide with a subframe boundary of an NR signal based on the NR synchronization.

In another embodiment, a frame boundary of an LTE signal based on the LTE synchronization may coincide with a frame boundary of an NR signal based on the NR synchronization.

In an embodiment, an NR SLSS identification (ID) related to the NR SLSS or an NR PSBCH in-coverage value included in the NR PSBCH information may be determined based on at least one of an LTE SLSS ID related to an LTE SLSS based on the LTE synchronization or an LTE PSBCH in-coverage value related to the LTE synchronization.

In an embodiment, the NR SLSS ID may be determined based on the LTE SLSS ID.

In an embodiment, the NR SLSS ID may be determined to be the same value as the LTE SLSS ID.

In an embodiment, the NR SLSS ID may be determined as a value obtained by multiplying the LTE SLSS ID by 2.

In an embodiment, the NR SLSS ID may be pre-configured by a base station.

In an embodiment, the NR PSBCH in-coverage value may be determined based on the LTE PSBCH in-coverage value.

In an embodiment, the NR PSBCH in-coverage value may be determined to be 0, based on the LTE PSBCH in-coverage value being 1, and the NR PSBCH in-coverage value may be determined to be 0, based on the LTE PSBCH in-coverage value being 0.

In an embodiment, the NR PSBCH in-coverage value may be determined to be the same value with the LTE PSBCH in-coverage value.

In an embodiment, the NR PSBCH in-coverage value may be pre-configured by a base station.

In an embodiment, the NR PSBCH in-coverage value may be determined to be 1, based on the first device being included in a coverage of a base station, the NR PSBCH in-coverage value may be determined to be 0, based on the first device not being included in the coverage of the base station. In this case, the base station may be an NR base station.

In an embodiment, an NR PSBCH slot index based on the NR synchronization or an index for the NR S-SSB is determined based on a direct frame number (DFN) determined by the LTE module or a subframe index.

A first device according to an embodiment may transmit capability information regarding coexistence in the first device of the LTE module and the NR module, to a base station.

According to an embodiment of the present disclosure, a first device for performing sidelink communication may be proposed. For example, the first device may comprise: one or more memories storing instructions; one or more transceivers; and one or more processors connected to the one or more memories and the one or more transceivers, wherein the one or more processors execute the instructions to: receive synchronization information from a synchronization source; obtain long-term evolution (LTE) synchronization through an LTE module included in the first device, based on the synchronization information; obtain new radio (NR) synchronization aligned with the LTE synchronization, through an NR module included in the first device; generate an NR sidelink synchronization signal (SLSS) and NR physical sidelink broadcast channel (PSBCH) information, based on information related to the LTE synchronization and the aligned NR synchronization; transmit an NR sidelink-synchronization signal block (S-SSB) including the NR SLSS and the NR PSBCH information, to a second device performing sidelink communication, based on the NR module; transmit first sidelink control information (SCI), to the second device, through a physical sidelink control channel (PSCCH); and transmit second SCI different from the first SCI and data, to the second device, through a physical sidelink shared channel (PSSCH) related to the PSCCH, based on a sidelink resource determined based on the first SCI.

According to an embodiment of the present disclosure, a device (or a chip(set)) adapted to control a first user equipment (UE) may be proposed. For example, the device comprising: one or more processors; and one or more memories operably connectable to the one or more processors and storing instructions, wherein the one or more processors execute the instructions to: receive synchronization information from a synchronization source; obtain long-term evolution (LTE) synchronization through an LTE module included in the first UE, based on the synchronization information; obtain new radio (NR) synchronization aligned with the LTE synchronization, through an NR module included in the first UE; generate an NR sidelink synchronization signal (SLSS) and NR physical sidelink broadcast channel (PSBCH) information, based on information related to the LTE synchronization and the aligned NR synchronization; transmit an NR sidelink-synchronization signal block (S-SSB) including the NR SLSS and the NR PSBCH information, to a second UE performing sidelink communication, based on the NR module; transmit first sidelink control information (SCI), to the second UE, through a physical sidelink control channel (PSCCH); and transmit second SCI different from the first SCI and data, to the second UE, through a physical sidelink shared channel (PSSCH) related to the PSCCH, based on a sidelink resource determined based on the first SCI.

In an embodiment, the first UE in the above embodiment may refer to a first device described in the first half of the present disclosure. In one example, the at least one processor, the at least one memory, etc. in the device for controlling the first UE may be implemented as a separate sub-chip, or at least two or more components may be implemented through one sub-chip.

According to an embodiment of the present disclosure, a non-transitory computer-readable storage medium storing instructions (or commands) may be proposed. The instructions, when executed, may cause a first device to: receive synchronization information from a synchronization source; obtain long-term evolution (LTE) synchronization through an LTE module included in the first device, based on the synchronization information; obtain new radio (NR) synchronization aligned with the LTE synchronization, through an NR module included in the first device; generate an NR sidelink synchronization signal (SLSS) and NR physical sidelink broadcast channel (PSBCH) information, based on information related to the LTE synchronization and the aligned NR synchronization; transmit an NR sidelink-synchronization signal block (S-SSB) including the NR SLSS and the NR PSBCH information, to a second device performing sidelink communication, based on the NR module; transmit first sidelink control information (SCI), to the second device, through a physical sidelink control channel (PSCCH); and transmit second SCI different from the first SCI and data, to the second device, through a physical sidelink shared channel (PSSCH) related to the PSCCH, based on a sidelink resource determined based on the first SCI.

Figure 13:
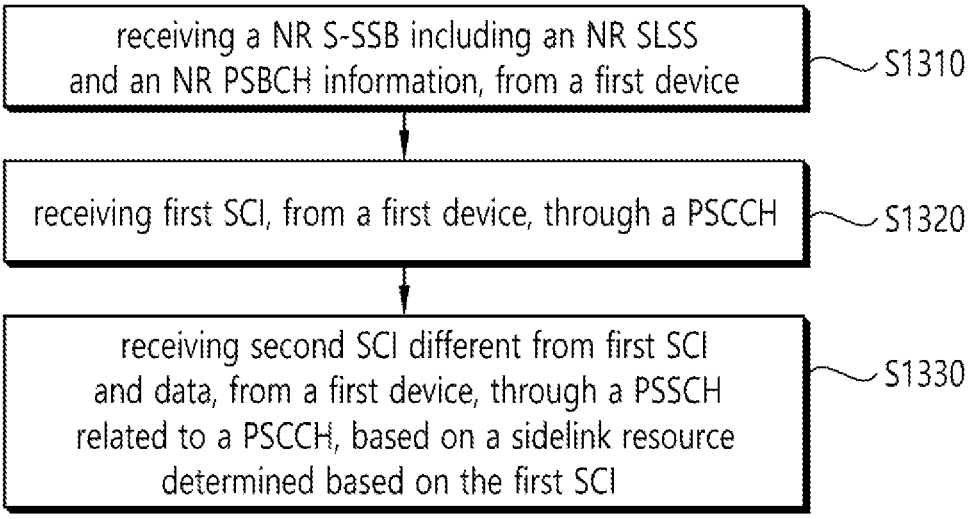
FIG. 13 is a flowchart showing a method for a second device to perform sidelink communication according to an embodiment of the present disclosure.

FIG. 13 is a flowchart showing a method for a second device to perform sidelink communication according to an embodiment of the present disclosure.

Operations disclosed in the flowchart of FIG. 13 may be performed in combination with various embodiments of the present disclosure. In one example, the operations disclosed in the flowchart of FIG. 13 may be performed based on at least one of devices shown in FIGS. 14 to 19. In one example, a second device of FIG. 13 may correspond to a second wireless device 200 of FIG. 15 to be described later, and a first device may correspond to a first wireless device 100 of FIG. 15. In another example, a second device of FIG. 13 may correspond to a first wireless device 100 of FIG. 15 to be described later, and a first device may correspond to a second wireless device 200.

In step S1310, a second device according to an embodiment may receive a new radio (NR) sidelink-synchronization signal block (S-SSB) including an NR sidelink synchronization signal (SLSS) and an NR physical sidelink broadcast channel (PSBCH) information, from a first device.

In step S1320, a second device according to an embodiment may receive first sidelink control information (SCI), from the first device, through a physical sidelink control channel (PSCCH).

In step S1330, a second device according to an embodiment may receive second SCI different from the first SCI and data, from the first device, through a physical sidelink shared channel (PSSCH) related to the PSCCH, based on a sidelink resource determined based on the first SCI.

In an embodiment, synchronization information may be received from a synchronization source, by the first device.

In an embodiment, an LTE synchronization may be obtained based on the synchronization information, by an LTE module included in the first device.

In an embodiment, an NR synchronization aligned with the LTE synchronization may be obtained, by an NR module included in the first device.

In an embodiment, the NR SLSS and the NR PSBCH information may be generated, based on information related to the LTE synchronization and the aligned NR synchronization.

In an embodiment, the information related to the LTE synchronization may be an LTE master information block (MIB), generated based on the synchronization information.

In an embodiment, the information related to the LTE synchronization may be index information regarding a time resource of an LTE signal.

In an embodiment, a subframe boundary of an LTE signal based on the LTE synchronization may coincide with a subframe boundary of an NR signal based on the NR synchronization.

In another embodiment, a frame boundary of an LTE signal based on the LTE synchronization may coincide with a frame boundary of an NR signal based on the NR synchronization.

In an embodiment, an NR SLSS identification (ID) related to the NR SLSS or an NR PSBCH in-coverage value included in the NR PSBCH information may be determined based on at least one of an LTE SLSS ID related to an LTE SLSS based on the LTE synchronization or an LTE PSBCH in-coverage value related to the LTE synchronization.

In an embodiment, the NR SLSS ID may be determined based on the LTE SLSS ID.

In an embodiment, the NR SLSS ID may be determined to be the same value as the LTE SLSS ID.

In an embodiment, the NR SLSS ID may be determined as a value obtained by multiplying the LTE SLSS ID by 2.

In an embodiment, the NR SLSS ID may be pre-configured by a base station.

In an embodiment, the NR PSBCH in-coverage value may be determined based on the LTE PSBCH in-coverage value.

In an embodiment, the NR PSBCH in-coverage value may be determined to be 0, based on the LTE PSBCH in-coverage value being 1, and the NR PSBCH in-coverage value may be determined to be 0, based on the LTE PSBCH in-coverage value being 0.

In an embodiment, the NR PSBCH in-coverage value may be determined to be the same value with the LTE PSBCH in-coverage value.

In an embodiment, the NR PSBCH in-coverage value may be pre-configured by a base station.

In an embodiment, the NR PSBCH in-coverage value may be determined to be 1, based on the first device being included in a coverage of a base station, the NR PSBCH in-coverage value may be determined to be 0, based on the first device not being included in the coverage of the base station. In this case, the base station may be an NR base station.

In an embodiment, an NR PSBCH slot index based on the NR synchronization or an index for the NR S-SSB is determined based on a direct frame number (DFN) determined by the LTE module or a subframe index.

In an embodiment, capability information regarding coexistence in the first device of the LTE module and the NR module may be transmitted to a base station, by the first device.

According to an embodiment of the present disclosure, a second device for performing sidelink communication may be proposed. For example, the second device may comprise: one or more memories storing instructions; one or more transceivers; and one or more processors connected to the one or more memories and the one or more transceivers, wherein the one or more processors execute the instructions to: receive a new radio (NR) sidelink-synchronization signal block (S-SSB) including an NR sidelink synchronization signal (SLSS) and an NR physical sidelink broadcast channel (PSBCH) information, from a first device; receive first sidelink control information (SCI), from the first device, through a physical sidelink control channel (PSCCH); and receive second SCI different from the first SCI and data, from the first device, through a physical sidelink shared channel (PSSCH) related to the PSCCH, based on a sidelink resource determined based on the first SCI, wherein synchronization information is received from a synchronization source, by the first device, wherein an LTE synchronization is obtained based on the synchronization information, by an LTE module included in the first device, wherein an NR synchronization aligned with the LTE synchronization is obtained, by an NR module included in the first device, and wherein the NR SLSS and the NR PSBCH information are generated, based on information related to the LTE synchronization and the aligned NR synchronization.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
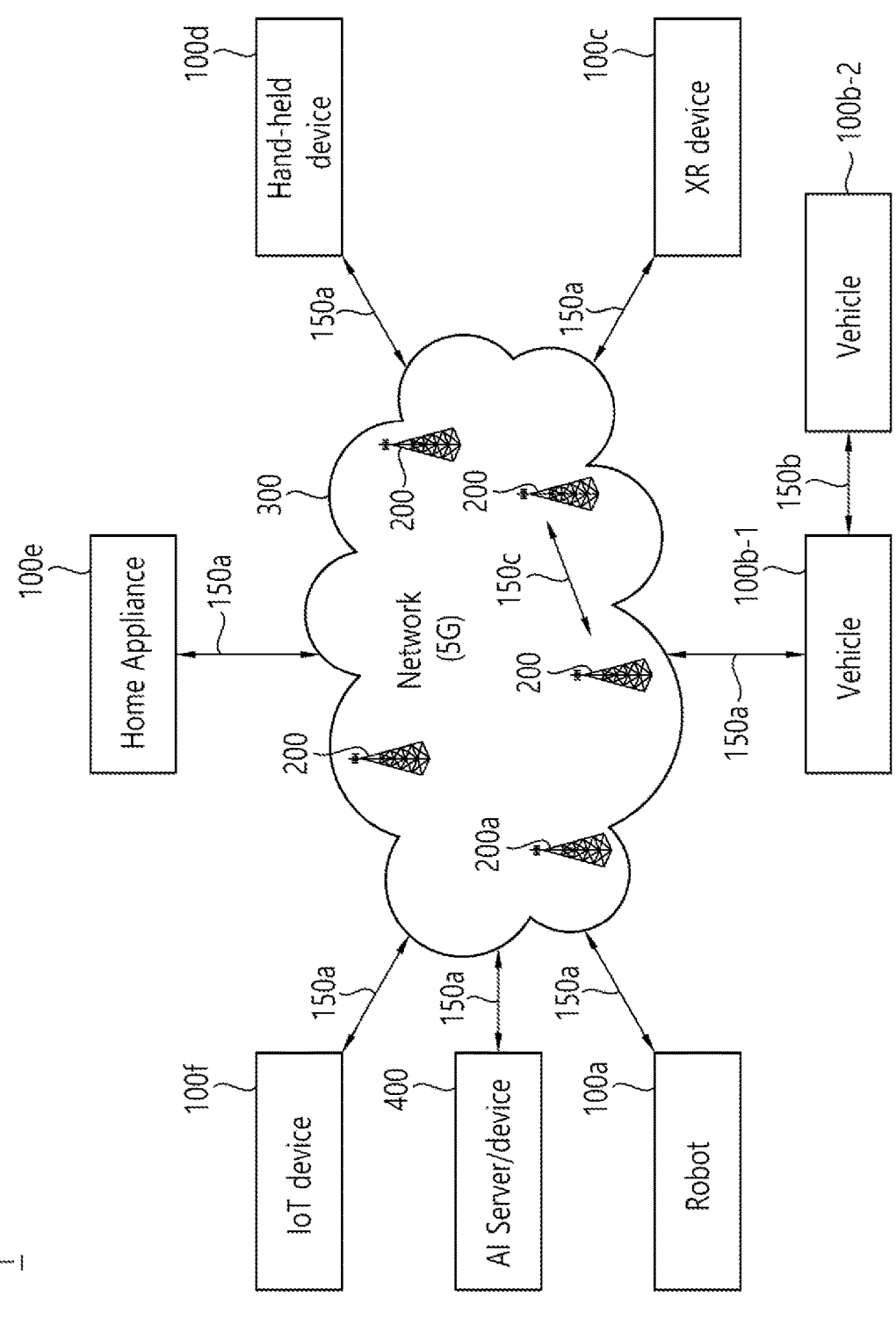
FIG. 14 shows a communication system 1, based on an embodiment of the present disclosure.

FIG. 14 shows a communication system 1, based on an embodiment of the present disclosure. The embodiment of FIG. 14 may be combined with various embodiments of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server

400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
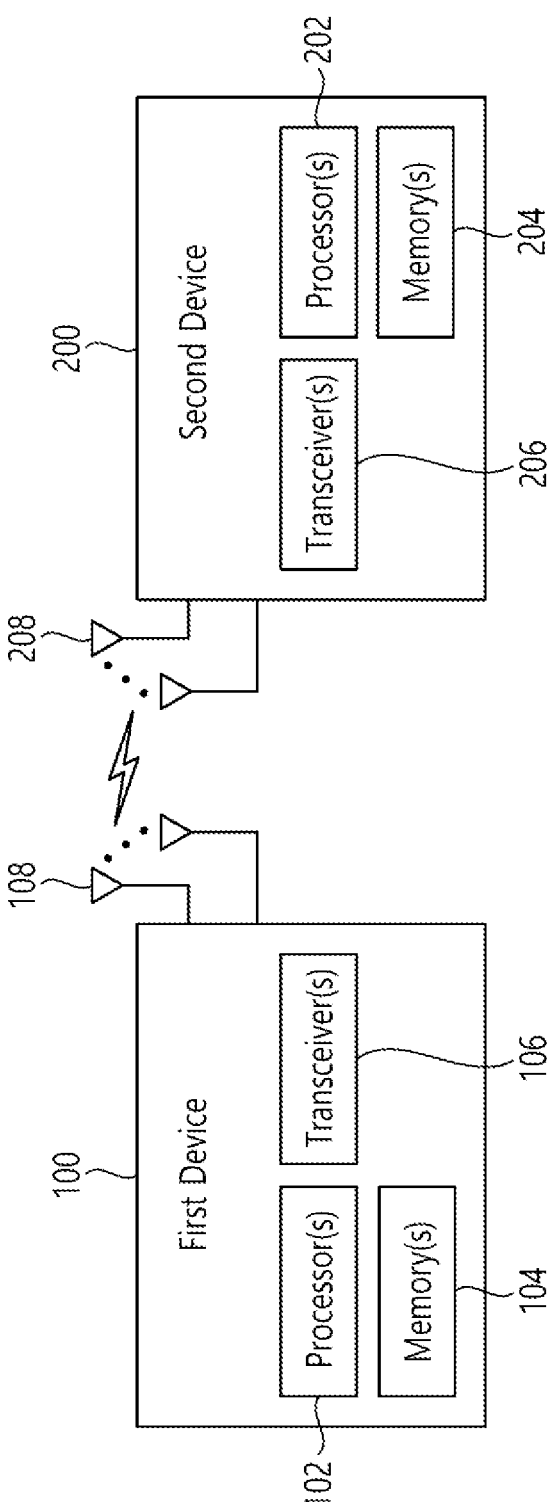
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement a RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
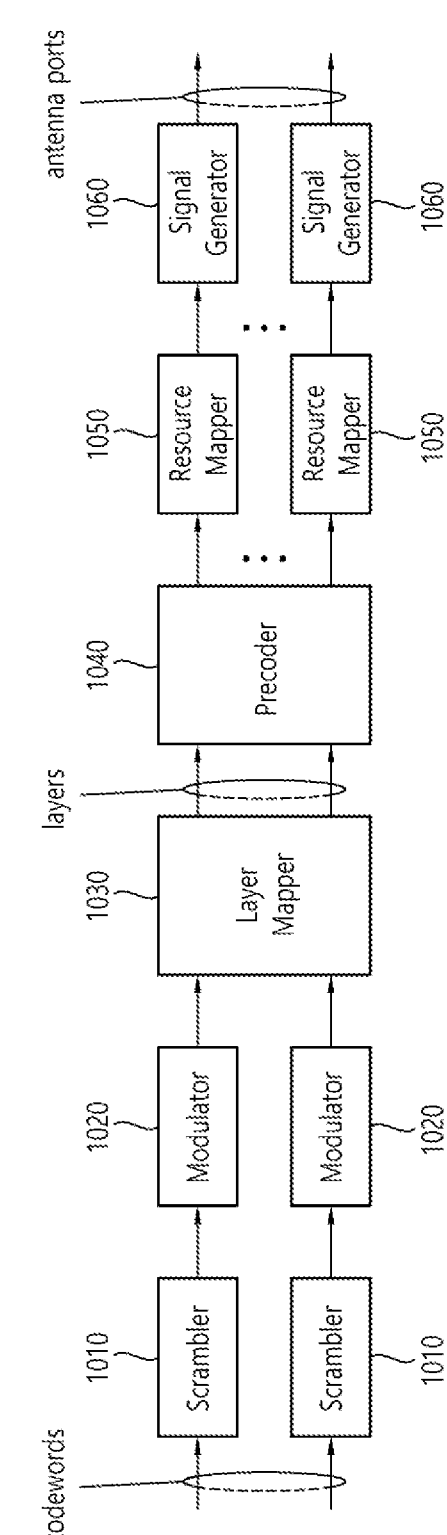
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
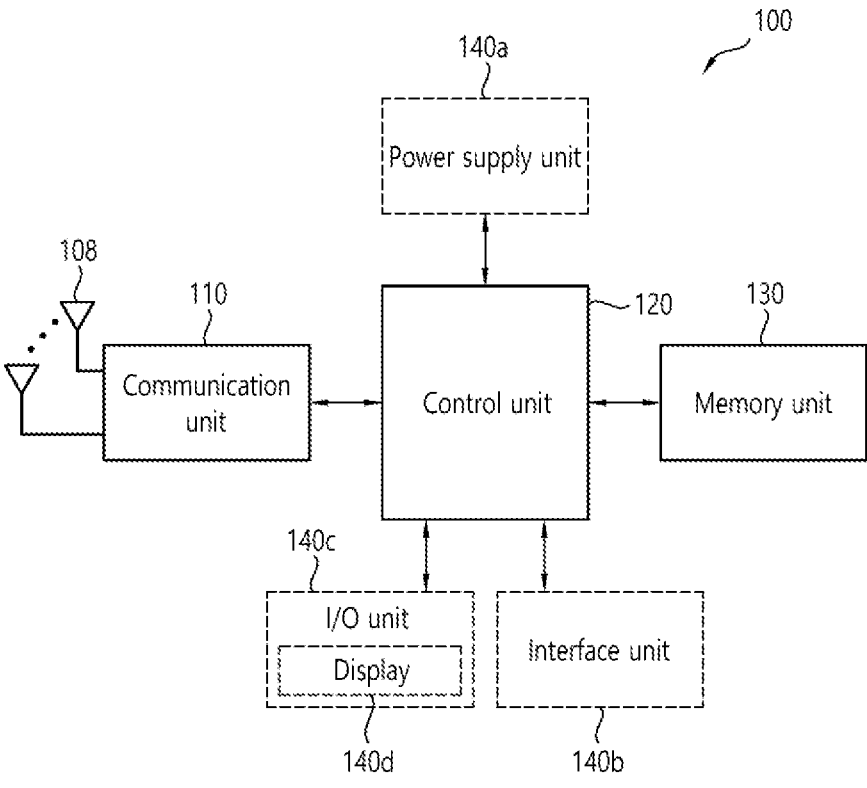
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
receiving, by a first device, synchronization information from a synchronization source;
obtaining, by the first device, long-term evolution (LTE) synchronization through an LTE module included in the first device, based on the synchronization information;
obtaining, by the first device, new radio (NR) synchronization aligned with the LTE synchronization, through an NR module included in the first device;
generating, by the first device, an NR sidelink synchronization signal (SLSS) and NR physical sidelink broadcast channel (PSBCH) information, based on information related to the LTE synchronization and the aligned NR synchronization;
transmitting, by the first device, an NR sidelink-synchronization signal block (S-SSB) including the NR SLSS and the NR PSBCH information, to a second device performing sidelink communication, based on the NR module;
transmitting, by the first device, first sidelink control information (SCI), to the second device, through a physical sidelink control channel (PSCCH); and
transmitting, by the first device, second SCI different from the first SCI and data, to the second device, through a physical sidelink shared channel (PSSCH) related to the PSCCH, based on a sidelink resource determined based on the first SCI,
wherein an NR PSBCH in-coverage value included in the NR PSBCH information is determined based on an LTE PSBCH in-coverage value related to the LTE synchronization.

2. The method of claim 1, wherein the information related to the LTE synchronization is an LTE master information block (MIB), generated based on the synchronization information.

3. The method of claim 1, wherein the information related to the LTE synchronization is index information regarding a time resource of an LTE signal.

4. The method of claim 1, wherein an NR SLSS identification (ID) related to the NR SLSS is determined based on an LTE SLSS ID related to an LTE SLSS based on the LTE synchronization.

5. The method of claim 4, wherein the NR SLSS ID is determined to be the same value as the LTE SLSS ID.

6. The method of claim 4, wherein the NR SLSS ID is determined as a value obtained by multiplying the LTE SLSS ID by 2.

7. The method of claim 1, wherein an NR SLSS identification (ID) related to the NR SLSS is pre-configured by a base station.

8. The method of claim 1, wherein the NR PSBCH in-coverage value is determined to be 0, based on the LTE PSBCH in-coverage value being 1, and
wherein the NR PSBCH in-coverage value is determined to be 0, based on the LTE PSBCH in-coverage value being 0.

9. The method of claim 1, wherein the NR PSBCH in-coverage value is determined to be the same value with the LTE PSBCH in-coverage value.

10. A first device for performing sidelink communication, the first device comprising:
at least one transceiver;
at least one processor; and
at least one memory connected to the at least one processor and storing instructions that, based on being executed, cause the first device to perform operations comprising:
receiving synchronization information from a synchronization source;
obtaining long-term evolution (LTE) synchronization through an LTE module included in the first device, based on the synchronization information;
obtaining new radio (NR) synchronization aligned with the LTE synchronization, through an NR module included in the first device;
generating an NR sidelink synchronization signal (SLSS) and NR physical sidelink broadcast channel (PSBCH) information, based on information related to the LTE synchronization and the aligned NR synchronization;
transmitting an NR sidelink-synchronization signal block (S-SSB) including the NR SLSS and the NR PSBCH information, to a second device performing sidelink communication, based on the NR module;
transmitting first sidelink control information (SCI), to the second device, through a physical sidelink control channel (PSCCH); and
transmitting second SCI different from the first SCI and data, to the second device, through a physical sidelink shared channel (PSSCH) related to the PSCCH, based on a sidelink resource determined based on the first SCI,
wherein an NR PSBCH in-coverage value included in the NR PSBCH information is determined based on an LTE PSBCH in-coverage value related to the LTE synchronization.

11. A device adapted to control a first user equipment (UE), the device comprising:
at least one processor; and
at least one memory connected to the at least one processor and storing instructions that, based on being executed, cause the first UE to perform operations comprising:
receiving synchronization information from a synchronization source;
obtaining long-term evolution (LTE) synchronization through an LTE module included in the first UE, based on the synchronization information;
obtaining new radio (NR) synchronization aligned with the LTE synchronization, through an NR module included in the first UE;
generating an NR sidelink synchronization signal (SLSS) and NR physical sidelink broadcast channel (PSBCH) information, based on information related to the LTE synchronization and the aligned NR synchronization;
transmitting an NR sidelink-synchronization signal block (S-SSB) including the NR SLSS and the NR PSBCH information, to a second UE performing sidelink communication, based on the NR module;
transmitting first sidelink control information (SCI), to the second UE, through a physical sidelink control channel (PSCCH); and
transmitting second SCI different from the first SCI and data, to the second UE, through a physical sidelink shared channel (PSSCH) related to the PSCCH, based on a sidelink resource determined based on the first SCI, wherein an NR PSBCH in-coverage value included in the NR PSBCH information is determined based on an LTE PSBCH in-coverage value related to the LTE synchronization.

* * * * *